US010978686B2

(12) United States Patent
Lee

(10) Patent No.: US 10,978,686 B2
(45) Date of Patent: Apr. 13, 2021

(54) SECONDARY BATTERY WITH EMBOSSED SAFETY VENT

(71) Applicant: Samsung SDI Co., Ltd., Yongin-si (KR)

(72) Inventor: Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 64 days.

(21) Appl. No.: 16/332,218

(22) PCT Filed: Jul. 18, 2017

(86) PCT No.: PCT/KR2017/007704
§ 371 (c)(1),
(2) Date: Mar. 11, 2019

(87) PCT Pub. No.: WO2018/056562
PCT Pub. Date: Mar. 29, 2018

(65) Prior Publication Data
US 2019/0237729 A1    Aug. 1, 2019

(30) Foreign Application Priority Data
Sep. 20, 2016 (KR) .................... 10-2016-0119916

(51) Int. Cl.
*H01M 2/12* (2006.01)
*H01M 2/02* (2006.01)
(Continued)

(52) U.S. Cl.
CPC ....... *H01M 2/1241* (2013.01); *H01M 2/0202* (2013.01); *H01M 2/0404* (2013.01);
(Continued)

(58) Field of Classification Search
CPC .... H01M 2/0473; H01M 2/12; H01M 2/1241; H01M 2/1235
See application file for complete search history.

(56) References Cited

U.S. PATENT DOCUMENTS 8,236,439 B2    8/2012   Byun et al.
8,486,546 B2    7/2013   Kim et al.
(Continued)

FOREIGN PATENT DOCUMENTS

JP    2000-149953 A    5/2000
JP    2015-15098 A    1/2015
(Continued)

OTHER PUBLICATIONS

International Search Report for corresponding International Application No. PCT/KR2017/007704, dated Oct. 23, 2017, 5pp.

*Primary Examiner* — Carlos Barcena
(74) *Attorney, Agent, or Firm* — Lewis Roca Rothgerber Christie LLP

(57) ABSTRACT

Various embodiments of the present invention relate to a secondary battery. The technical problem to be solved is to provide a secondary battery having an embossed safety vent, which is not damaged by an external force generated during a manufacturing process, can clearly define a rupture area or shape, and makes process management for rupture area or shape easy. To this end, various embodiments of the present invention disclose a secondary battery comprising: a case, a cap plate which is installed in the case and has a vent hole; and a safety vent which is coupled to the vent hole of the cap plate and ruptures when the internal pressure of the case is greater than a reference pressure, wherein the safety vent comprises an embossed portion; and a notch portion formed in the embossed portion.

8 Claims, 10 Drawing Sheets

(51) Int. Cl.
    *H01M 2/04*         (2006.01)
    *H01M 10/0525*     (2010.01)

(52) U.S. Cl.
    CPC ......... *H01M 2/12* (2013.01); *H01M 10/0525* (2013.01); *Y02E 60/10* (2013.01); *Y02T 10/62* (2013.01); *Y02T 10/70* (2013.01)

(56) References Cited

U.S. PATENT DOCUMENTS

| | | | |
|---|---|---|---|
| 8,658,296 | B2 | 2/2014 | Byun |
| 9,287,539 | B2 | 3/2016 | Sode et al. |
| 9,653,716 | B2 | 5/2017 | Sode et al. |
| 2003/0131880 | A1* | 7/2003 | Marubayashi ...... H01M 2/1241 137/68.27 |
| 2007/0154782 | A1* | 7/2007 | Cho ................... H01M 2/1241 429/56 |
| 2010/0136388 | A1 | 6/2010 | Kim et al. |
| 2011/0039136 | A1 | 2/2011 | Byun et al. |
| 2011/0206957 | A1 | 8/2011 | Byun |
| 2013/0196188 | A1 | 8/2013 | Sode et al. |
| 2016/0036033 | A1* | 2/2016 | Zhang ................. H01M 2/043 429/53 |
| 2016/0149179 | A1 | 5/2016 | Sode et al. |
| 2017/0222201 | A1 | 8/2017 | Sode et al. |

FOREIGN PATENT DOCUMENTS

| | | |
|---|---|---|
| KR | 10-2008-0082266 A | 9/2008 |
| KR | 10-2010-0062886 A | 6/2010 |
| KR | 10-2011-0017820 A | 2/2011 |
| KR | 10-1043577 B1 | 6/2011 |
| KR | 10-2011-0097573 A | 8/2011 |
| KR | 10-1530458 B1 | 6/2015 |

* cited by examiner

SECONDARY BATTERY WITH EMBOSSED SAFETY VENT

CROSS-REFERENCE TO RELATED APPLICATION(S)

This application is a National Phase Patent Application of International Patent Application Number PCT/KR2017/007704, filed on Jul. 18, 2017, which claims priority of Korean Patent Application No. 10-2016-0119916, filed Sep. 20, 2016. The entire contents of both of which are incorporated herein by reference.

TECHNICAL FIELD

The present invention relates to a secondary battery.

BACKGROUND ART

In general, unlike a primary battery that cannot be charged, a secondary battery can be charged and discharged. A low-capacity secondary battery packaged in the form of a pack comprised of one single cell is used as the power source for various portable small-sized electronic devices, such as smart phones, digital cameras, laptop computers, tablets, and so on. A high-capacity secondary battery in which several tens of cells are connected in a battery pack is used as the power source for motor drives, such as those in electric scooters, hybrid vehicles, or electric vehicles.

A secondary battery may be manufactured in various shapes, including, for example, a prismatic type, a cylindrical type and a pouch type. The secondary battery is generally constructed by accommodating an electrode assembly formed by interposing a separator between positive and negative electrode plates in a case together with an electrolytic solution and then installing a cap plate in the case. In some cases, a solid electrolyte as an ion conductor may be interposed between positive and negative electrode plates without an electrolytic solution. Of course, a positive electrode terminal and a negative electrode terminal are connected to the electrode assembly and are then exposed and protruded to the outside through the cap plate.

The above information disclosed in this Background section is only for enhancement of understanding of the background of the described technology and therefore it may contain information that does not form the prior art that is already known in this country to a person of ordinary skill in the art.

Technical Problems to be Solved

Various embodiments of the present invention provide a secondary battery having an embossed safety vent, which is not damaged by an external force generated during a manufacturing process, can clearly define a rupture area or shape, and makes process management for rupture area or shape easy.

Technical Solutions

In accordance with an aspect of the present invention, the above and other objects can be accomplished by providing a secondary battery including a case, a cap plate which is installed in the case and has a vent hole, and a safety vent which is coupled to the vent hole of the cap plate and ruptures when the internal pressure of the case is greater than a reference pressure, wherein the safety vent includes an embossed portion, and a notch portion formed in the embossed portion.

The embossed portion may include a first embossed portion formed along the periphery of the embossed portion and protruding in a first direction, a second embossed portion formed in the first embossed portion and protruding in a second direction opposite to the first direction, and a third embossed portion formed in the second embossed portion and protruding in the first direction.

The notch portion may be formed in the third embossed portion.

The first embossed portion and the third embossed portion may have semicircular cross sections protruding in the first direction.

The third embossed portion may have a rectangular cross section protruding in the second direction.

The second embossed portion may be shaped to have multiple portions divided by the third embossed portion, and the divided second embossed portions may be all coplanar.

The third embossed portions may have +-shaped, X-shaped, or I-shaped planes.

The first embossed portion may have an elliptical plane.

The safety vent may include a sloping portion outwardly extending from the first embossed portion in the first direction, and a peripheral portion outwardly extending from the sloping portion and coupled to a peripheral portion of a vent hole of the cap plate.

Advantageous Effects

As described above, various embodiments of the present invention provides a secondary battery having an embossed safety vent, which is not damaged by an external force generated during a manufacturing process, can clearly define a rupture area or shape, and can facilitate process management for the rupture area or shape.

That is to say, according to various embodiments of the present invention, the safety vent includes a first embossed portion protruding in a downward direction, a second embossed portion protruding in an upward direction while inwardly extending to the first embossed portion, the second embossed portion specifically having a perfectly planar top surface, a third embossed portion protruding in a downward direction while inwardly extending to the second embossed portion, and a notch portion formed in the third embossed portion. Therefore, the safety vent, including the first, second and third embossed portions and the notch portion, may rarely undergo a spring back phenomenon, irrespective of the elongation of a metal. In particular, since the spring back phenomenon rarely occurs to the first, second and third embossed portions and the notch portion, safety vents produced in large quantities may have uniformly managed shapes and dimensions (heights).

Therefore, in the secondary batteries employing the above-described safety vent, rupture pressures may be all equally set, thereby improving safety and reliability. That is to say, according to various embodiments of the present invention, a rupture area or shape of the safety vent can be clearly defined, and the process management for the rupture area or shape can be facilitated.

In addition, since the notch portion is finally formed after forming the first, second and third embossed portions, it is possible to suppress the safety vent from being damaged during a manufacturing process.

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Figure 1:
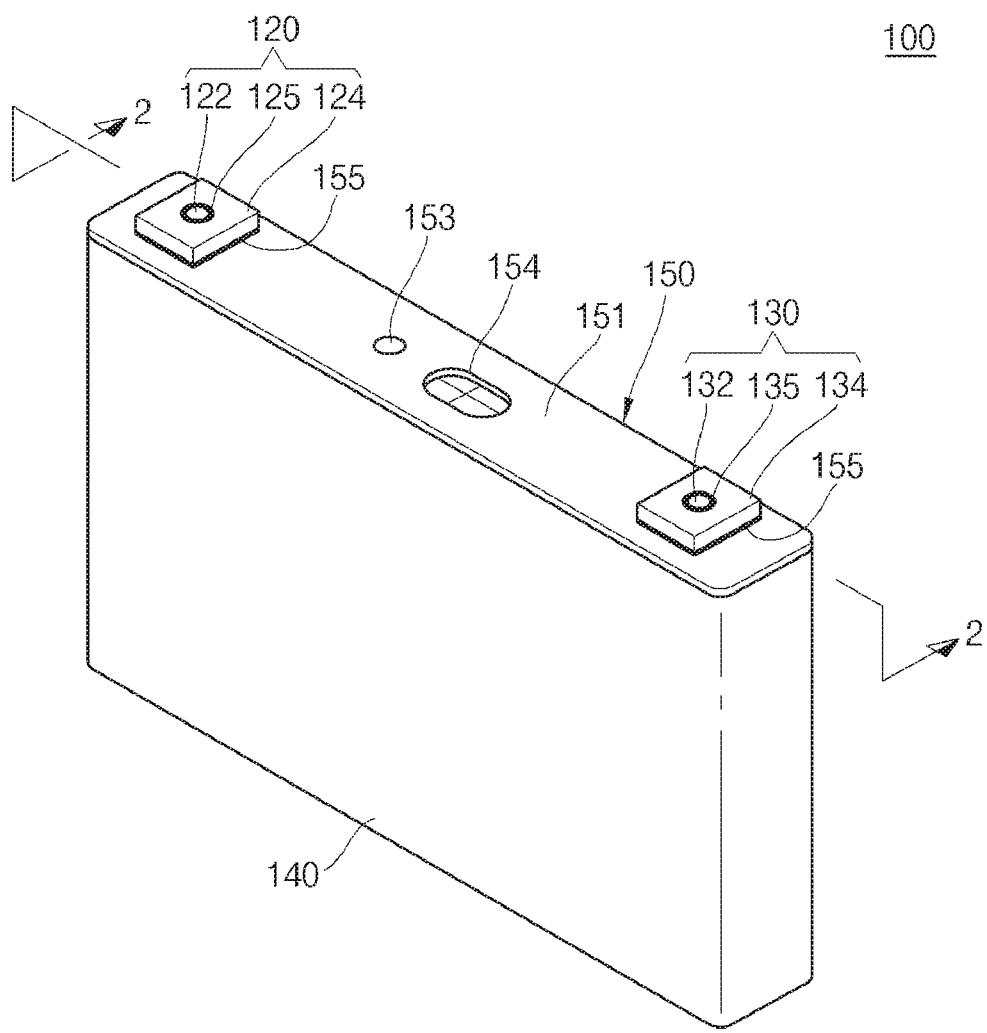
FIG. 1 is a perspective view of a secondary battery according to various embodiments of the present invention.
Figure 2:
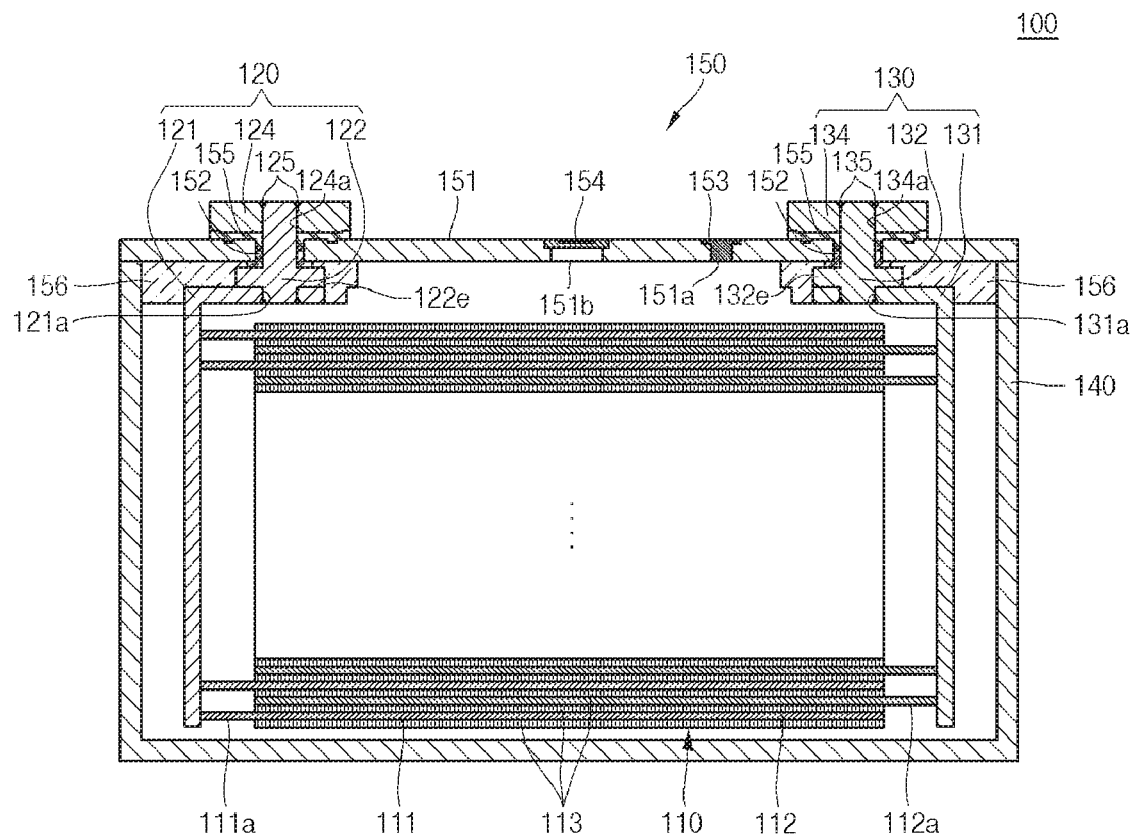
FIG. 2 is a cross-sectional view taken along the line 2-2 of FIG. 1.

FIG. 1 is a perspective view of a secondary battery according to various embodiments of the present invention, and FIG. 2 is a cross-sectional view taken along the line 2-2 of FIG. 1.

As illustrated in FIGS. 1 and 2, the secondary battery 100 according to various embodiments of the present invention includes an electrode assembly 110, a first terminal 120, a second terminal 130, a case 140 and a cap assembly 150.

The electrode assembly 110 has a wound or laminated stacked structure including a first electrode plate 111, a separator 113, and a second electrode plate 112, which are thin plates or layers. In this embodiment, the first electrode plate 111 may operate as a negative electrode and the second electrode plate 112 may operate as a positive electrode, or vice versa.

The first electrode plate 111 may include a first electrode collector formed of a metal foil made of, for example, copper, a copper alloy, nickel or a nickel alloy, and a first electrode active material, such as, graphite or carbon, on the first electrode collector. In addition, the first electrode plate 111 may include a first electrode uncoated portion 111a where the first electrode active material is not applied. The first electrode uncoated portion 111a may function as a passage for current flowing between the first electrode plate 111 and an exterior of the first electrode plate 111. However, embodiments of the present invention are not limited to the material of the first electrode plate 111 listed herein.

The second electrode plate 112 may include a second electrode collector formed of a metal foil made of, for example, aluminum or an aluminum alloy, and a second electrode active material, such as, a transition metal oxide, on the second electrode collector. In addition, the second electrode plate 112 may include a second electrode uncoated portion 112a where the second electrode active material is not applied. The second electrode uncoated portion 112a may function as a passage for current flowing between the second electrode plate 112 and an exterior of the second electrode plate 112. However, embodiments of the present invention are not limited to the material of the second electrode plate 112 listed herein.

In other embodiments, polarities of the first and second electrode plates 111 and 112 may differ from what is described above.

The separator 113 may be positioned between the first electrode plate 111 and the second electrode plate 112 to prevent electrical short circuits and to allow movement of lithium ions. The separator 113 may be made of, but not limited to, a material selected from the group consisting of polyethylene, polypropylene, a copolymer of polypropylene and polyethylene, and combinations thereof. In addition, the separator 113 may be replaced by an inorganic solid electrolyte not requiring a liquid- or gel-phase electrolytic solution, such as a sulfide-based, oxide-based or phosphate-based compound.

The first terminal 120 and the second terminal 130 electrically connected to the first electrode plate 111 and the second electrode plate 112, respectively, are positioned at opposite ends of the electrode assembly 110. For example, the electrode assembly 110 is accommodated in the case 140 with an electrolyte, but embodiments of the present invention are not limited thereto. The electrolytic solution may include an organic solvent, such as EC (ethylene carbonate), PC (propylene carbonate), DEC (diethyl carbonate), EMC (ethyl methyl carbonate), or DMC (dimethyl carbonate), and a lithium salt, such as $LiPF_6$, or $LiBF_4$. In addition, the electrolyte may be in a liquid, solid or gel phase. As described above, when an inorganic solid electrolyte is used, the electrolyte may not be employed.

The first terminal 120 is made of a metal and is electrically connected to the first electrode plate 111. The first terminal 120 includes a first collector plate 121, a first terminal pillar 122 and a first terminal plate 124.

The first collector plate 121 is brought into contact with the first electrode uncoated portion 111a protruding to one end of the electrode assembly 110. The first collector plate 121 is welded to the first electrode uncoated portion 111a. The first collector plate 121 may have a roughly shape and has a terminal hole 121a formed at its top portion. The first terminal pillar 122 is fitted into the terminal hole 121a to then be riveted and/or welded. The first collector plate 121 is made of, for example, copper or a copper alloy, but embodiments of the present invention are not limited to the material of the first collector plate 121 to those listed herein.

The first terminal pillar 122 upwardly protrudes a predetermined length and extends while penetrating through a cap plate 151, which will be described later, and is electrically connected to the first collector plate 121 under the cap plate 151. In addition, while upwardly protruding a predetermined length and extending from the cap plate 151, the first terminal pillar 122 has a flange 122e formed under the cap plate 151 to prevent the first terminal pillar 122 from being dislodged from the cap plate 151. A region of the first terminal pillar 122 positioned under the flange 122e is fitted into the first terminal hole 121a of the first collector plate 121 to then be riveted and/or welded. Here, the first terminal pillar 122 is electrically insulated from the cap plate 151. The first terminal pillar 122 may be made of, for example, copper, a copper alloy, aluminum or an aluminum alloy, but embodiments of the present invention are not limited to the material of the first collector terminal 122 listed herein.

The first terminal plate 124 has a hole 124a, and the first terminal pillar 122 is coupled to the hole 124a to then be riveted and/or welded. For example, boundary regions of the upwardly exposed first terminal pillar 122 and the first terminal plate 124 are welded to each other, but embodiments of the present invention are not limited thereto. For example, laser beam is applied to the boundary regions of the upwardly exposed first terminal pillar 122 and the first terminal plate 124, and the boundary regions are welded to each other to then be cooled, followed by welding. The welded regions are marked with reference numeral 25 in FIG. 2.

Meanwhile, a busbar (not shown) made of aluminum or an aluminum alloy may be welded to the first terminal plate 124.

The second terminal 130 is also made of a metal and is electrically connected to the second electrode plate 112. The second terminal 130 includes a second collector plate 131, a second terminal pillar 132 and a second terminal plate 134.

The second collector plate 131 is brought into contact with the second electrode uncoated portion 112a protruding to the other end of the electrode assembly 110. The second collector plate 131 may have a roughly shape and has a terminal hole 131a formed at its top portion. The second terminal pillar 132 is fitted into the terminal hole 131a to then be coupled thereto. The second collector plate 131 is made of, for example, aluminum or an aluminum alloy, but embodiments of the present invention are not limited to the material of the second collector plate 131 to those listed herein.

The second terminal pillar 132 upwardly protrudes a predetermined length and extends while penetrating through the cap plate 151 to be described later, and is electrically connected to the second collector plate 131 under the cap plate 151. In addition, while upwardly protruding a predetermined length and extending from the cap plate 151, the second terminal pillar 132 has a flange 132e formed under the cap plate 151 to prevent the second terminal pillar 132 from being dislodged from the cap plate 151. A region of the second terminal pillar 132 positioned under the flange 132e is fitted into the second terminal hole 131a of the second collector plate 131 to then be riveted and/or welded. Here, the second terminal pillar 132 is electrically insulated from the cap plate 151. The second terminal pillar 132 may be made of, for example, aluminum or an aluminum alloy, but embodiments of the present invention are not limited to the material of the second terminal pillar 132 listed herein.

The second terminal plate 134 has a hole 134a. In addition, the second terminal plate 134 is coupled to the second terminal pillar 132. That is to say, the second terminal pillar 132 is coupled to the hole 134a of the second terminal plate 134. In addition, the second terminal pillar 132 and the second terminal plate 134 are riveted and/or welded to each other. For example, boundary regions of the upwardly exposed second terminal pillar 132 and the second terminal plate 134 are welded to each other, but embodiments of the present invention are not limited thereto. For example, laser beam is applied to the boundary regions of the upwardly exposed second terminal pillar 132 and the second terminal plate 134, and the boundary regions are welded to each other to then be cooled, followed by welding.

Additionally, a busbar (not shown) made of aluminum or an aluminum alloy is easily welded to the second terminal plate 134. Here, the second terminal plate 134 may be electrically connected to the cap plate 151. Therefore, the cap plate 151 and the case 140, which will be described below, may have the same polarity with the second terminal 130 (e.g., a positive polarity).

Here, a winding axis of the electrode assembly 110 (that is, a horizontal axis extending in the left-right direction in FIG. 2) is substantially perpendicular to or maintained at approximately 90 degrees with respect to a terminal axis of the first terminal pillar 122 of the first terminal 120 (a vertical axis extending in the top-down direction in FIG. 2) and a terminal axis of the second terminal pillar 132 of the second terminal 130 (a vertical axis extending in the top-down direction in FIG. 2).

The case 140 is made of, for example, a conductive metal, such as aluminum, an aluminum alloy or nickel plated steel, but embodiments of the present invention are not limited to the material of the case 140 listed herein. The case 140 may have an approximately hexahedral shape having an opening through which the electrode assembly 110, the first terminal 120 and the second terminal 130 may be inserted and placed. In FIG. 2, the case 140 and the cap assembly 150 assembled to each other are illustrated. Thus, the opening, which is a substantially opened part of the peripheral edge of the cap plate 150, is not illustrated in FIG. 2. Meanwhile, the interior surface of the case 140 is subjected to insulation treatment such that it maintains electrical isolation from the electrode assembly 110, the first terminal 120, the second terminal 130 and the cap assembly 150.

The cap assembly 150 is coupled to the case 140. In detail, the cap assembly 150 includes the cap plate 151, a seal gasket 152, a plug 153, a safety vent 154, an upper insulation member 155 and a lower insulation member 156.

The cap plate 151 may seal the opening of the case 140 and may be made of the same material with the case 140. For example, the cap plate 151 may be coupled to the case 140 by laser welding, but embodiments of the present invention are not limited thereto. Here, since the cap plate 151 may have the same polarity with the second terminal 130, as described above, the cap plate 151 and the case 140 may also have the same polarity.

The seal gasket 152 is formed between each of the first terminal pillar 122 and the second terminal pillar 132 and the cap plate 151 using an insulating material, and seals gaps between each of the first terminal pillar 122 and the second terminal pillar 132 and the cap plate 151. The seal gasket 152 may prevent external moisture from penetrating into the secondary battery 100 or may prevent internal electrolyte contained in the secondary battery 100 from flowing out.

The plug 153 hermetically seals an electrolyte injection hole 151a of the cap plate 151, and the safety vent 154 is installed in a vent hole 151b of the cap plate 151 and has a notch portion (154a of FIGS. 3B, 4A and 4B) formed to be opened at a preset pressure.

The upper insulation member 155 is formed between each of the first terminal pillar 122 and the second terminal pillar 132 and the cap plate 151. In addition, the upper insulation member 155 is brought into close contact with the cap plate 151. Further, the upper insulation member 155 may also be brought into close contact with the seal gasket 152. The upper insulation member 155 insulates the first terminal pillar 122 and the second terminal pillar 132 from the cap plate 151.

The lower insulation member 156 is formed between each of the first collector plate 121 and the second collector plate 131 and the cap plate 151 and prevents unnecessary electrical short circuits from occurring therebetween. That is to say, the lower insulation member 156 prevents electrical short circuits from occurring between the first collector plate 121 and the cap plate 151 and between the second collector plate 131 and the cap plate 151.

Figure 3A:
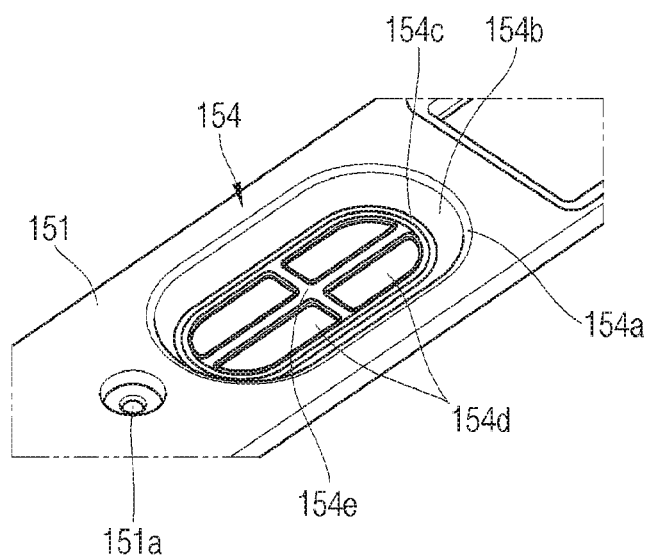
FIGS. 3A and 3B are a front perspective view and a rear view illustrating an embossed safety vent and a cap plate with the same installed therein in the secondary battery according to various embodiments of the present invention.
Figure 3B:
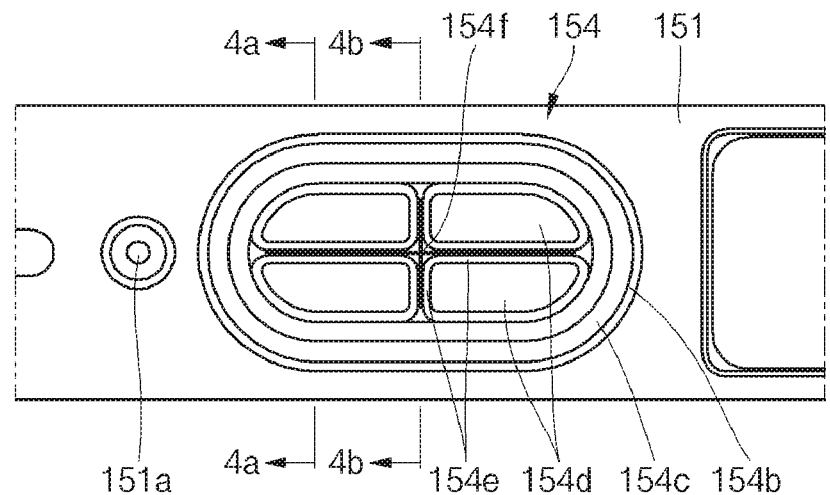
Figure 4A:
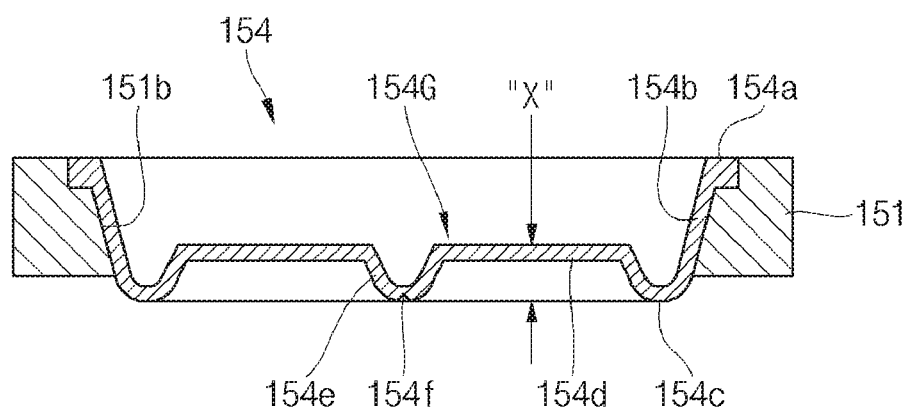
FIGS. 4A and 4B are cross-sectional views taken along lines 4a-4b of FIG. 3
Figure 4B:
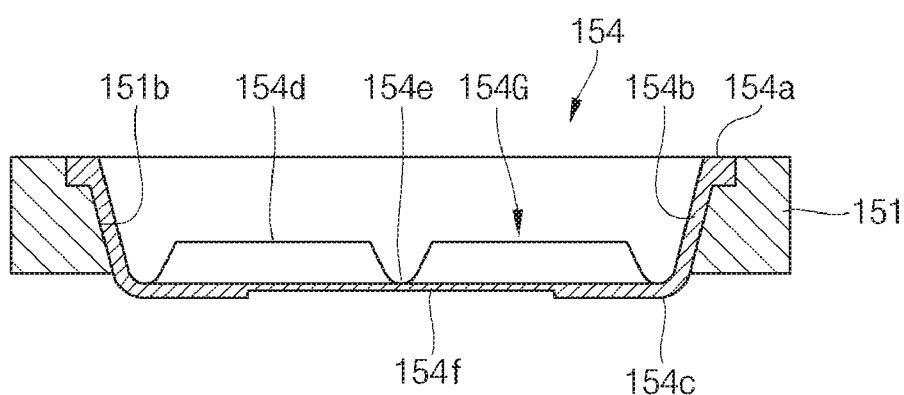
Figure 4C:
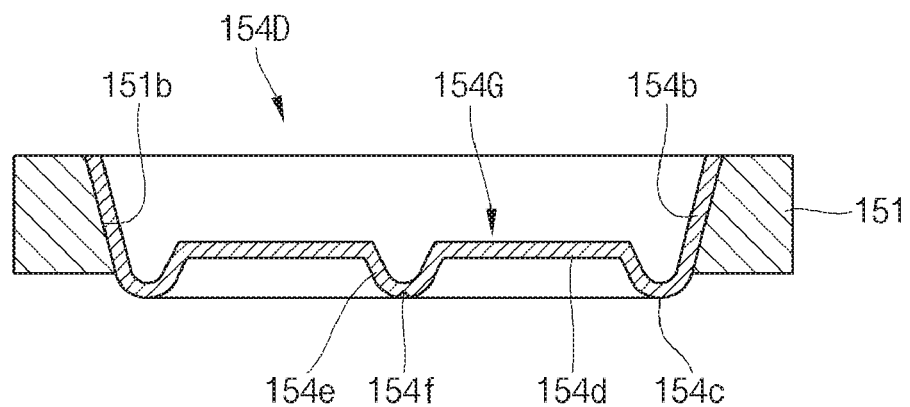
FIG. 4C is a cross-sectional view illustrating another exemplary safety vent.

FIGS. 3A and 3B are a front perspective view and a rear view illustrating an embossed safety vent 154 and a cap plate 151 with the same installed therein in the secondary battery 100 according to various embodiments of the present invention, and FIGS. 4A and 4B are cross-sectional views taken along lines 4a-4b of FIG. 3 and FIG. 4C is a cross-sectional view illustrating another exemplary safety vent 154D.

As illustrated in FIGS. 3A and 3B and FIGS. 4A and 4B, the safety vent 154 is coupled to an inner wall of the inclined vent hole 151b of the cap plate 151. When the internal pressure of the case 140 is greater than a reference pressure, the safety vent 154 ruptures to allow the internal gas of the case 140 to be rapidly released to the outside, thereby avoiding a dangerous situation of the secondary battery 100.

To this end, the safety vent 154 includes a peripheral portion 154a coupled to the inner wall or stepped portion of the vent hole 151b, a sloping portion 154b extending from the peripheral portion 154a, an embossed portion 154G planarly extending from the sloping portion 154b in a substantially horizontal direction, and a notch portion 154f formed in the embossed portion 154G.

The peripheral portion 154a may be welded to the inner wall or stepped portion of the vent hole 151b by, for example, laser welding, but embodiments of the present invention are not limited thereto. To perform welding, the peripheral portion 154a may have a thickness greater than that of the sloping portion 154b or the embossed portion 154G.

The sloping portion 154b may extend from the peripheral portion 154a to be inclined in an inwardly downward direction (for example, in a first direction), but embodiments of the present invention are not limited thereto. Here, the sloping portion 154b may be brought into close contact with and fixed to, for example, the inclined inner wall of the vent hole 151b, but embodiments of the present invention are not limited thereto. Therefore, when the secondary battery 100 is in a normal state, it is possible to prevent the internal electrolyte from leaking out along the interfacial surface between the safety vent 154 and the vent hole 151b.

The embossed portion 154G extends from the sloping portion 154b and is formed to be substantially planar in a horizontal direction. That is to say, the embossed portion 154G may include a first embossed portion 154c protruding in a downward direction (for example, in the first direction), a second embossed portion 154d protruding in an upward direction (for example, in a second direction), and a third embossed portion 154e protruding in the downward direction.

The first embossed portion 154c is connected to the sloping portion 154b and has, for example, a substantially semicircular cross section protruding in the downward direction, but embodiments of the present invention are not limited thereto. In addition, the second embossed portion 154d is connected to the first embossed portion 154c and has, for example, a substantially rectangular cross section protruding in an upward direction, but embodiments of the present invention are not limited thereto. Here, a top surface of the second embossed portion 154d may be substantially or perfectly planar. The third embossed portion 154e is connected to the second embossed portion 154d and has, for example, a substantially semicircular section protruding in the downward direction, but embodiments of the present invention are not limited thereto.

Here, the first embossed portion 154c has, for example, a substantially a rectangular or elliptical plane. That is to say, the first embossed portion 154c is in the shape of a rectangle having four rounded corners in a planar view. In addition, the second embossed portion 154d is in the shape of, for example, a plane having multiple portions divided by the third embossed portion 154e in a planar view, but embodiments of the present invention are not limited thereto. That is to say, the third embossed portion 154e has, for example, a substantially +-shaped plane, but embodiments of the present invention are not limited thereto. Of course, ends of the third embossed portion 154e may be connected to the first embossed portion 154c.

As illustrated in FIGS. 3A and 3B, the second embossed portion 154d may also have a plane having four portions divided by the +-shaped third embossed portion 154e in a planar view. Of course, top surfaces of the four divided portions of the second embossed portion 154d are all coplanar, and bottom surfaces thereof are also coplanar. That is to say, according to embodiments of the present invention, as illustrated in FIG. 4A, heights of the four divided portions of the second embossed portion 154d, as denoted by "X" values, are all equal to one another. In addition, the X values for various types of the safety vent 154 may be equally managed without a deviation. That is to say, during formation of the first embossed portion 154c, the second embossed portion 154d and the third embossed portion 154e, a spring back phenomenon can be minimized, irrespective of the elongation of a metal used in forming the safety vent 154, and the X values can be uniformly managed to equal values without a deviation in the X values depending on the type of the safety vent 154 manufactured.

Therefore, according to various embodiments of the present invention, the rupture area or shape of the safety vent 154 can be clearly defined, and a process management for the rupture area or shape can be facilitated.

Meanwhile, in order to reduce a dead volume of the case 140, bottom ends of the first embossed portion 154c and the third embossed portion 154e of the safety vent 154 are preferably positioned lower than a bottom surface of the cap plate 151. In addition, in order to make pressures converge on the vent hole 151b, a top end of the second embossed portion 154d is preferably positioned inside the vent hole 151b, that is, above the bottom surface of the cap plate 151.

In addition, a thickness of the embossed portion 154G, that is, the overall thickness of the first, second and third embossed portions 154c, 154d and 154e, may vary according to characteristics of the secondary battery 100, but may be generally in the range of approximately 0.2 mm to approximately 2 mm. Accordingly, the notch portion 154f may have a thickness in the range of, for example, approximately 0.01 mm to approximately 1 mm, but embodiments of the present invention are not limited to the thickness of the notch portion 154f disclosed herein. As described above, such dimension values may change in various manners according to design characteristics of a secondary battery.

The notch portion 154f may be formed along the third embossed portion 154e. That is to say, the notch portion 154f may have, for example, a substantially +-shaped plane, which is the same with or substantially the same with the third embossed portion 154e, but embodiments of the present invention are not limited thereto. The notch portion 154f may be formed along the center of the bottom surface of the third embossed portion 154e. In some cases, however, notch portion 154f may be formed along the center of the top surface of the third embossed portion 154e. As described above, since the third embossed portion 154e and the notch portion 154f are formed in substantially +-shaped configurations, the safety vent 154 may rupture in a substantially +-shaped configuration when the internal pressure of the case 140 is greater than the reference pressure.

In addition, as illustrated in FIG. 4C, in the safety vent 154d according to another embodiment of the present invention, only a sloping portion 154b can be directly welded to an inner wall of the vent hole 151b of the cap plate 151 without a relatively thick peripheral portion 154a. Since the peripheral portion 154a having a stepped portion is not provided in the safety vent 154d, the vent hole 151b formed on the cap plate 151 with an inclination can be easily processed and the safety vent 154 can also be easily processed. Of course, the welding is performed along the interfacial surface formed between the top end of the sloping portion 154b and the inner wall of the vent hole 151b.

Figure 5A:
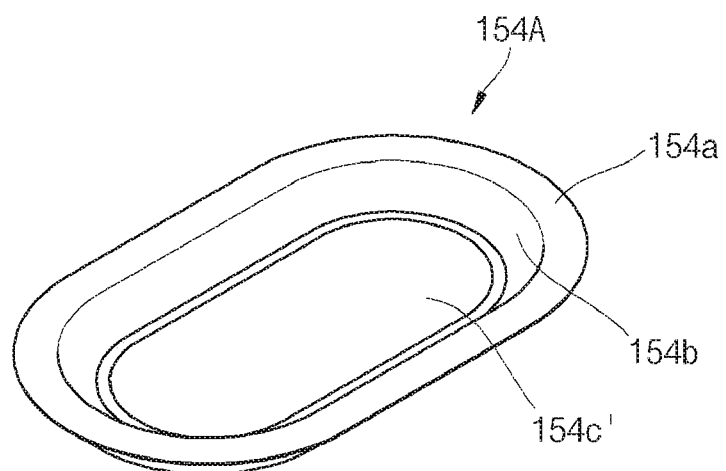
FIGS. 5A and 5B are front perspective views and FIG. 5C is a rear perspective view illustrating a method of manufacturing an embossed safety vent in the secondary battery according to various embodiments of the present invention.
Figure 5B:
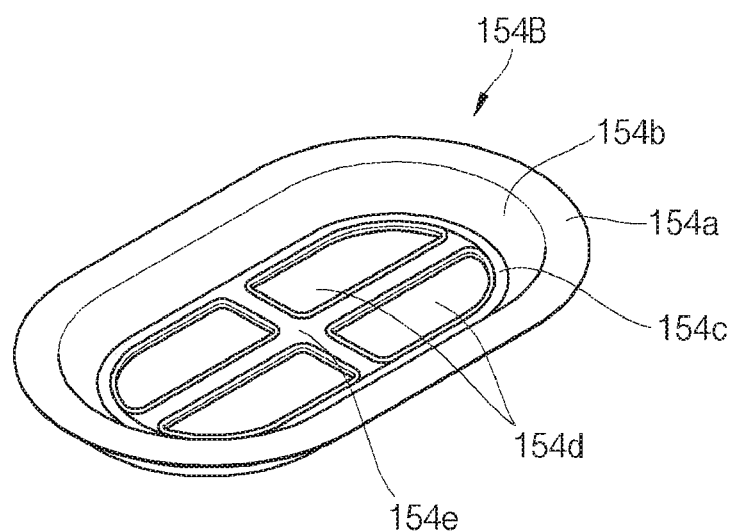
Figure 5C:
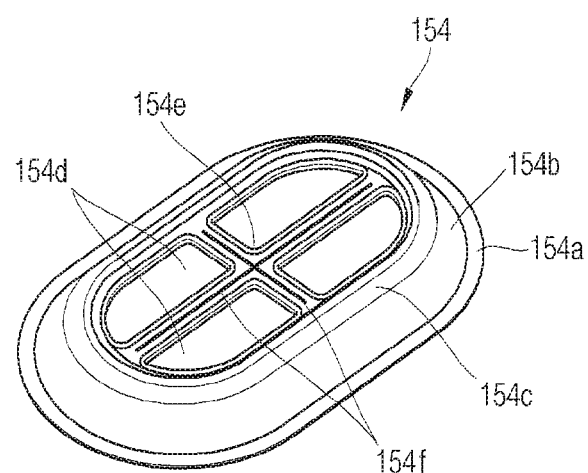

FIGS. 5A and 5B are front perspective views and FIG. 5C is a rear perspective view illustrating a method of manufacturing an embossed safety vent in the secondary battery 100 according to various embodiments of the present invention.

As illustrated in FIG. 5A, a planar metal plate may be subjected to a first forging process, for example, to be processed to turn into a first preliminary safety vent 154A, including a substantially planar peripheral portion 154a, a sloping portion 154b extending from the peripheral portion 154a to be inclined in an inwardly downward direction, and a planar portion 154c' planarly extending from the sloping portion 154b in a substantially horizontal direction, but embodiments of the present invention are not limited thereto. Here, the sloping portion 154b and the planar portion 154c' may be formed more thinly than the peripheral portion 154a. Of course, the peripheral portion 154a may not be provided in some cases.

Here, the first forging process may include, for example, providing a lower mold having an opening and an upper mold having a punch to be coupled to the opening, placing a planar metal plate between the lower mold and the upper mold, and coupling the punch of the upper mold to the opening of the lower mold to allow the planar metal plate placed between the lower mold and the upper mold to be processed to turn into the first preliminary safety vent 154A including the peripheral portion 154a, the sloping portion 154b and the planar portion 154c', but embodiments of the present invention are not limited thereto.

Meanwhile, the planar metal plate may be, for example, one selected from the group consisting of general aluminum, an aluminum alloy and an equivalent thereof, but embodiments of the present invention are not limited thereto.

As illustrated in FIG. 5B, the planar portion 154c' of the first preliminary safety vent 154A may be processed to turn into a first embossed portion 154c, a second embossed portion 154d and a third embossed portion 154e by, for example, a second forging process, but embodiments of the present invention are not limited thereto. Here, the second embossed portion 154d and the third embossed portion 154e may be formed after forming the first embossed portion 154c, the first embossed portion 154c may be formed after forming the second embossed portion 154d and the third embossed portion 154e, or the first embossed portion 154c, the second embossed portion 154d and the third embossed portion 154e may be formed at the same time. Practically, the second embossed portion 154d may be a portion that is naturally formed or defined as the result of forming the first embossed portion 154c and the third embossed portion 154e.

Here, the first embossed portion 154c may be formed to have, for example, a substantially semicircular cross section protruding in a downward direction (i.e., in a first direction), but embodiments of the present invention are not limited thereto. In addition, the first embossed portion 154c may be formed to have, for example, a substantially elliptical plane, but embodiments of the present invention are not limited thereto. Practically, the first embossed portion 154c may be formed along boundary surfaces between the planar portion 154c' and the sloping portion 154b.

In addition, the second embossed portion 154d may be formed to have, for example, a rectangular cross section protruding in an upward direction (i.e., in a second direction), that is, a top surface of the second embossed portion 154d may be perfectly planar, but embodiments of the present invention are not limited thereto. In addition, the second embossed portion 154d may be formed to have, for example, a substantially rectangular plane having a rounded portion at its one side, but embodiments of the present invention are not limited thereto.

The third embossed portion 154e may be formed to have, for example, a substantially semicircular cross section protruding in the downward direction and a substantially +-shaped plane. Here, an end of the third embossed portion 154e may be connected to the first embossed portion 154c. In addition, the second embossed portion 154d is practically divided by the third embossed portion 154e, yielding multiple second embossed portions 154d. Here, all of the divided second embossed portions 154d may have the same area.

Of course, even after the dividing, all of top surfaces of the divided second embossed portions 154d may still have the same height or may still be coplanar. That is to say, heights ranging from an imaginary line connecting bottom ends of the first embossed portion 154c and the second embossed portions 154d to planar bottom surfaces or planar top surfaces of the multiple second embossed portions 154d are all the same with one another, which means that the X values are equal to one another, as described above.

Moreover, these constructional characteristics commonly apply to all types of the safety vents 154 manufactured according to embodiments of the present invention. In other words, the above-described first and second forging processes bring about minimized spring back phenomena, irrespective of the intrinsic elongation of a metal, which is because the above-described constructional characteristics commonly apply to all of the manufactured safety vents 154.

Here, the second forging process may include, for example, providing a lower mold having a trench and an upper mold having a protrusion to be coupled to the trench, placing the first preliminary safety vent 154A between the lower mold and the upper mold, and coupling the protrusion of the upper mold to the trench of the lower mold to allow the planar portion 154c' of the first preliminary safety vent 154A placed between the lower mold and the upper mold to be processed to turn into a second preliminary safety vent 154B, including the first embossed portion 154c, the second embossed portion 154d and the third embossed portion 154e, but embodiments of the present invention are not limited thereto.

Here, planar shapes of the trench of the lower mold and the protrusion of the upper mold may substantially correspond to those of the first embossed portion 154c and the third embossed portion 154e.

As illustrated in FIG. 5C, a notch portion 154f may be formed along the third embossed portion 154e. The notch portion 154f may be formed along, for example, a bottom end of the third embossed portion 154e, but embodiments of the present invention are not limited thereto. Here, since the third embossed portion 154e is formed in a substantially +-shaped configuration, the notch portion 154f is also formed in a substantially +-shaped configuration. In addition, the notch portion 154f may be shorter than the third embossed portion 154e or may be longer than the third embossed portion 154e. That is to say, in some cases, the notch portion 154f may be formed to have a predetermined length along the bottom end of the first embossed portion 154c as well as the bottom end of the third embossed portion 154e. Moreover, in some cases, the notch portion 154f may be formed in the first embossed portion 154c only, instead of the third embossed portion 154e.

In addition, although the notch portion 154f formed along the bottom surface of the third embossed portion 154e is illustrated in FIG. 5C, it may also be formed along a top surface of the third embossed portion 154e. Of course, the notch portion 154f may be formed along the top surfaces of the third embossed portion 154e and the first embossed portion 154c or along the top surface of the first embossed portion 154c.

In addition, the notch portion 154f is configured to rupture when the internal pressure of the case 140 is greater than a reference pressure, thereby rapidly making the internal pressure of the case 140 equalized to atmospheric pressure. Therefore, the notch portion 154f is formed to have a smaller thickness (to be more thinly) than the third embossed portion 154e. Of course, in a case where the notch portion 154f is formed in the first embossed portion 154c, the notch portion 154f is formed to have a smaller thickness than the first embossed portion 154c.

In such a way, according to various embodiments of the present invention, since the notch portion 154f is formed at a final stage, it is possible to provide the secondary battery 100 including the embossed safety vent 154, which is unlikely damaged during a manufacturing process, can clearly define a rupture area or shape, and can facilitate process management for the rupture area or shape.

Meanwhile, the notch portion 154f can be formed in various manners. For example, the notch portion 154f can be formed using laser beam or an etching process. In addition, the notch portion 154f may also be formed using a mold. For example, in a state in which the top surface of the third embossed portion 154e is coupled to an upper mold having a semicircular protrusion formed therein, the bottom surface of the third embossed portion 154e is pressed by a lower mold having a substantially +-shaped protrusion, thereby forming the notch portion 154f. Moreover, the notch portion 154f may also be formed together during formation of the first, second third embossed portions 154c, 154d.

Figure 6A:
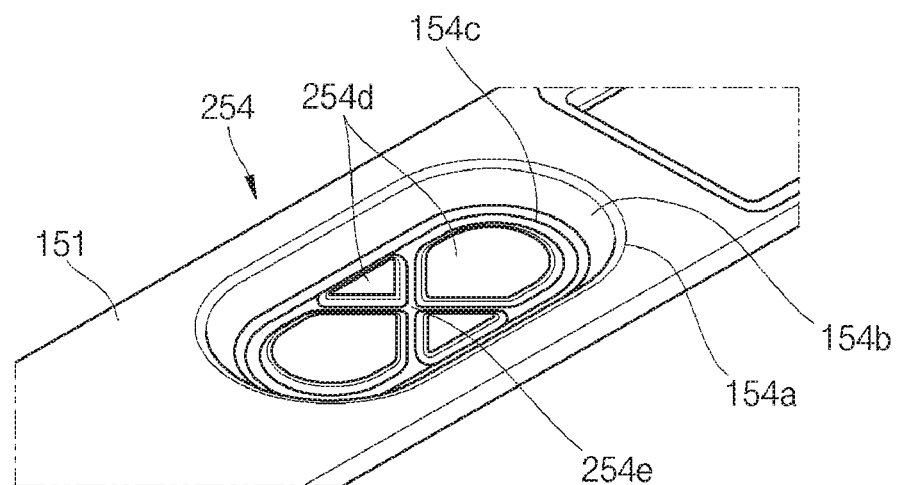
FIGS. 6A and 6B are a front perspective view and a rear view illustrating an embossed safety vent and a cap plate with the same installed therein in the secondary battery according to various embodiments of the present invention.
Figure 6B:
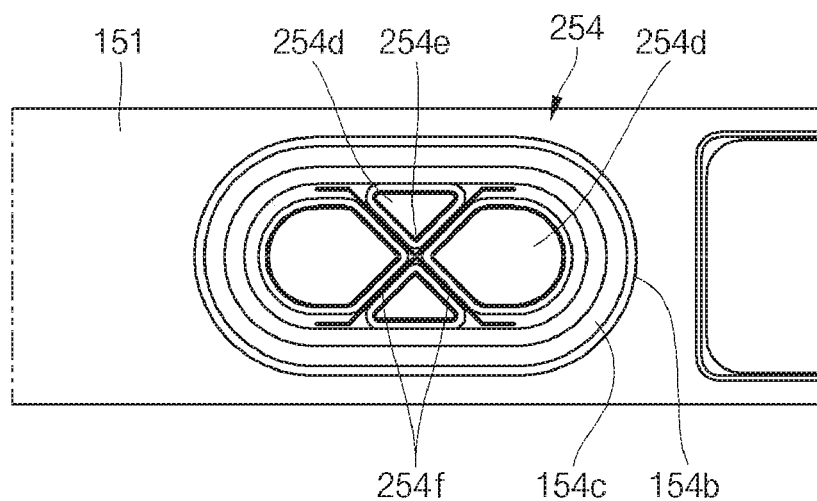

FIGS. 6A and 6B are a front perspective view and a rear view illustrating an embossed safety vent 254 and a cap plate 151 with the same installed therein in the secondary battery 100 according to various embodiments of the present invention.

As illustrated in FIGS. 6A and 6B, the safety vent 254 according to the embodiment of the present invention may include a third embossed portion 254e having, for example, a substantially X-shaped plane, but embodiments of the present invention are not limited thereto. Accordingly, a notch portion 254f may also be formed to have, for example, a substantially X-shaped plane, but embodiments of the present invention are not limited thereto. In addition, the notch portion 254f may be formed not only in the third embossed portion 254e but also in a portion of a first embossed portion 154c. Moreover, with this configuration of the X-shaped third embossed portion 254e, the safety vent 254 may include second embossed portions 254d having different areas. That is to say, the areas of two of the second embossed portions 254d divided by the third embossed portion 254e may be greater than those of the other two second embossed portions 254d. As described above, since the third embossed portion 254e and the notch portion 254f are formed in substantially X-shaped configuration in a planar view, the safety vent 254 may rupture in a substantially X-shaped configuration when the internal pressure of the case 140 is greater than a reference pressure.

Figure 7A:
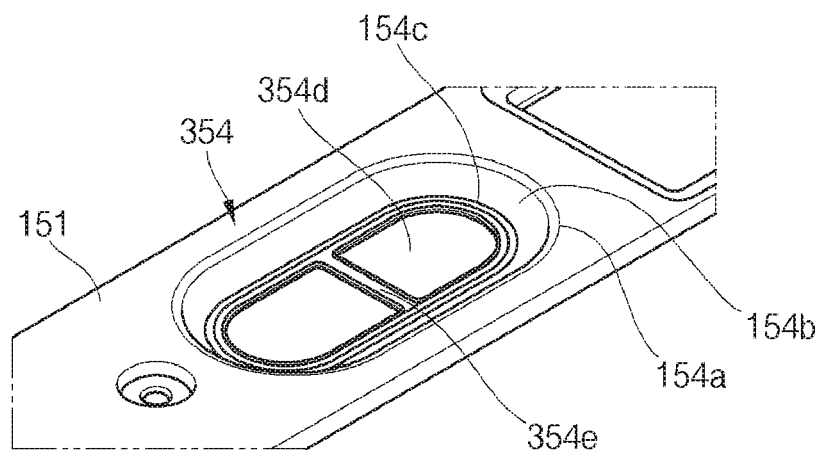
FIGS. 7A and 7B are a front perspective view and a rear view illustrating an embossed safety vent and a cap plate with the same installed therein in the secondary battery according to various embodiments of the present invention.
Figure 7B:
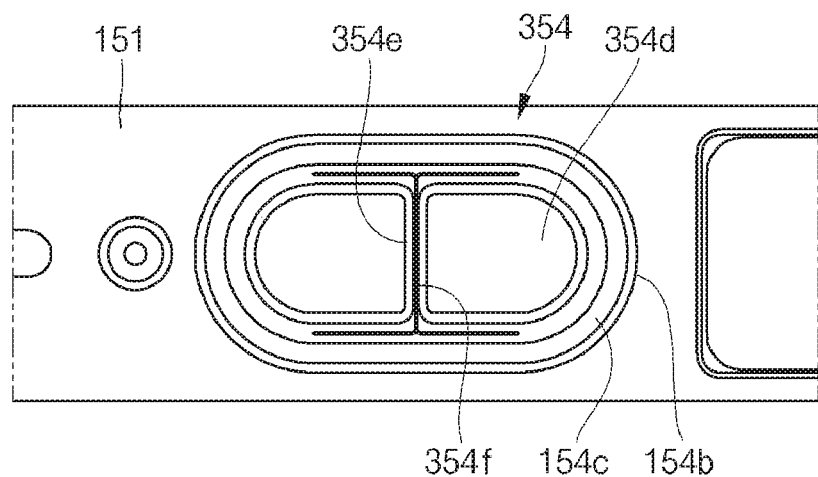

FIGS. 7A and 7B are a front perspective view and a rear view illustrating an embossed safety vent 354 and a cap plate 151 with the same installed therein in the secondary battery 100 according to various embodiments of the present invention.

As illustrated in FIGS. 7A and 7B, the safety vent 354 according to the embodiment of the present invention may include a third embossed portion 354e having, for example, a substantially I-shaped plane, but embodiments of the present invention are not limited thereto. Accordingly, a notch portion 354f may also be formed to have, for example, a substantially I-shaped plane, but embodiments of the present invention are not limited thereto. In addition, the notch portion 354f may be formed not only in the third embossed portion 354e but also in a portion of a first embossed portion 154c. Moreover, with this configuration of the I-shaped third embossed portion 354e, the safety vent 354 may include second embossed portions 354d having the same area. That is to say, the areas of two of the second embossed portions 354d divided by the third embossed portion 354e may be equal to each other. As described above, since the third embossed portion 354e and the notch portion 354f are formed in substantially I-shaped configuration in a planar view, the safety vent 354 may rupture in a substantially I-shaped configuration when the internal pressure of the case 140 is greater than a reference pressure.

Figure 8:
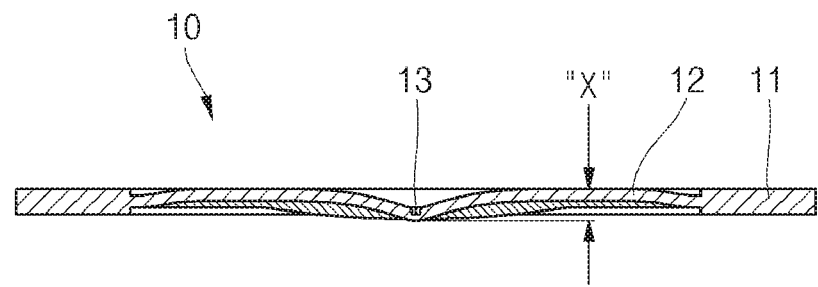
FIG. 8 is a cross-sectional view illustrating a general safety vent for a secondary battery.

FIG. 8 is a cross-sectional view illustrating a general safety vent 10 for a secondary battery.

As illustrated in FIG. 8, the general safety vent 10 may include a relatively thick peripheral portion 11, a relatively thin planar portion 12 inwardly extending from the peripheral portion 11 in a substantially horizontal direction, and a notch portion 13 formed roughly at the center of the planar portion 12.

Here, the planar portion 12 is subjected to a forging process to be formed in a substantially gull-winged configuration in a sectional view. As illustrated in FIG. 8, the planar portion 12 may have irregular X values due to elongation of a metal used in forming the safety vent 10 or a spring back phenomenon. Particularly, since the respective X values of various safety vents 10 are different, the safety vents 10 may rupture (operate) at different points in time in various secondary batteries employing the same, thereby lowering the battery safety or reliability. The term X value used herein may be defined as a distance between bottommost and topmost ends of the planar portion 12 where the notch portion 13 is formed.

According to the present invention, however, as described above, the first embossed portion 154c, the second embossed portion 154d and the third embossed portion 154e are willfully formed in the safety vent 154, the second embossed portion 154d is formed to be perfectly planar as a whole, and the notch portion 154f is formed along the third embossed portion 154e and/or the first embossed portion 154c, thereby minimizing a spring back phenomenon, irrespective of the elongation of the metal forming the safety vent 154, and ultimately eliminating a deviation in the X value. Therefore, in the secondary battery 100 employing the safety vent 154 according to the embodiments of the present invention, the safety vent 154 may operate at an equal point in rupturing time, thereby improving the safety and reliability of the secondary battery 100.

Figure 9A:
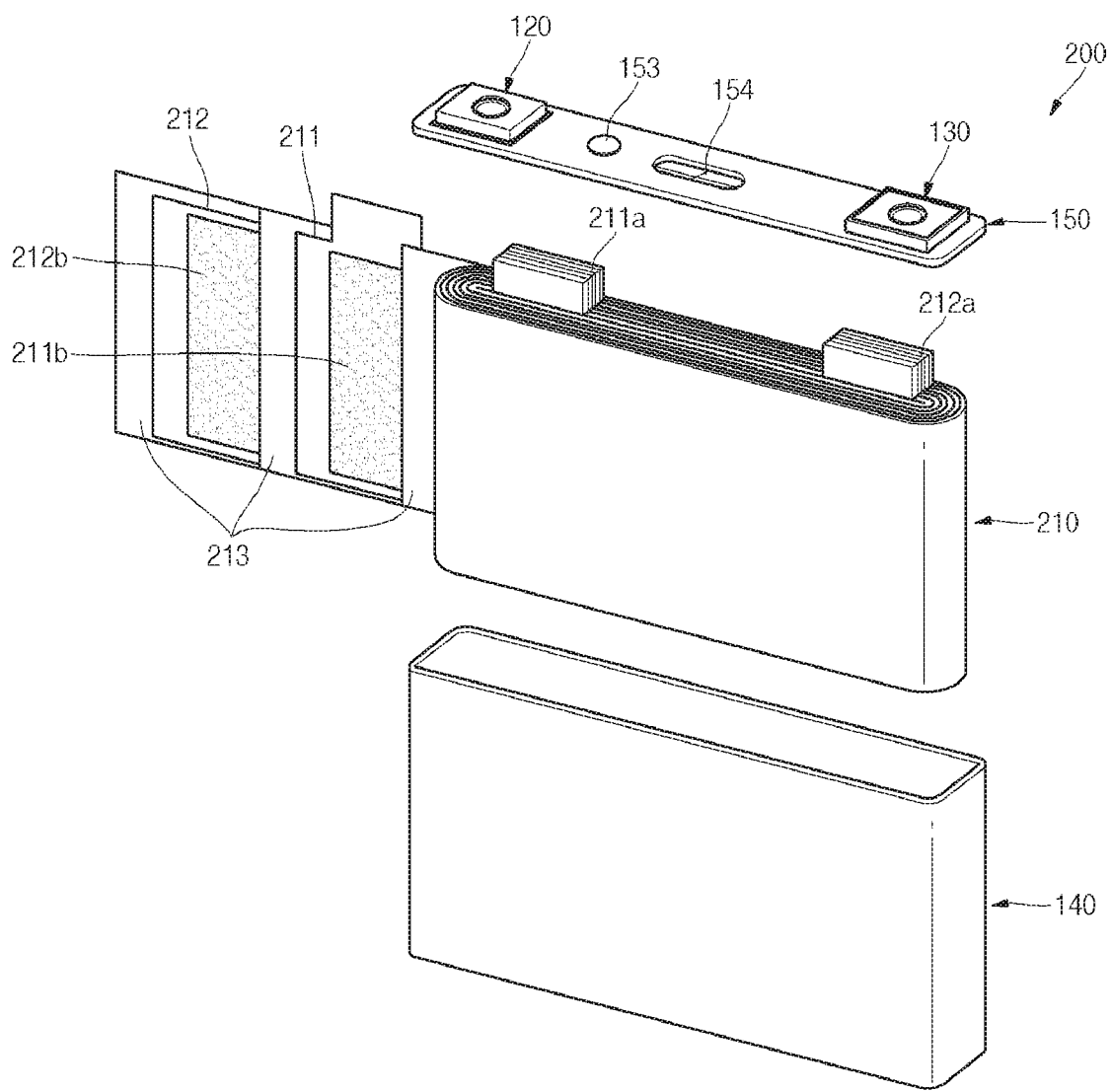
FIGS. 9A and 9B are an exploded perspective view and a cross-sectional view of another exemplary secondary battery with an embossed safety vent according to various embodiments of the present invention.
Figure 9B:
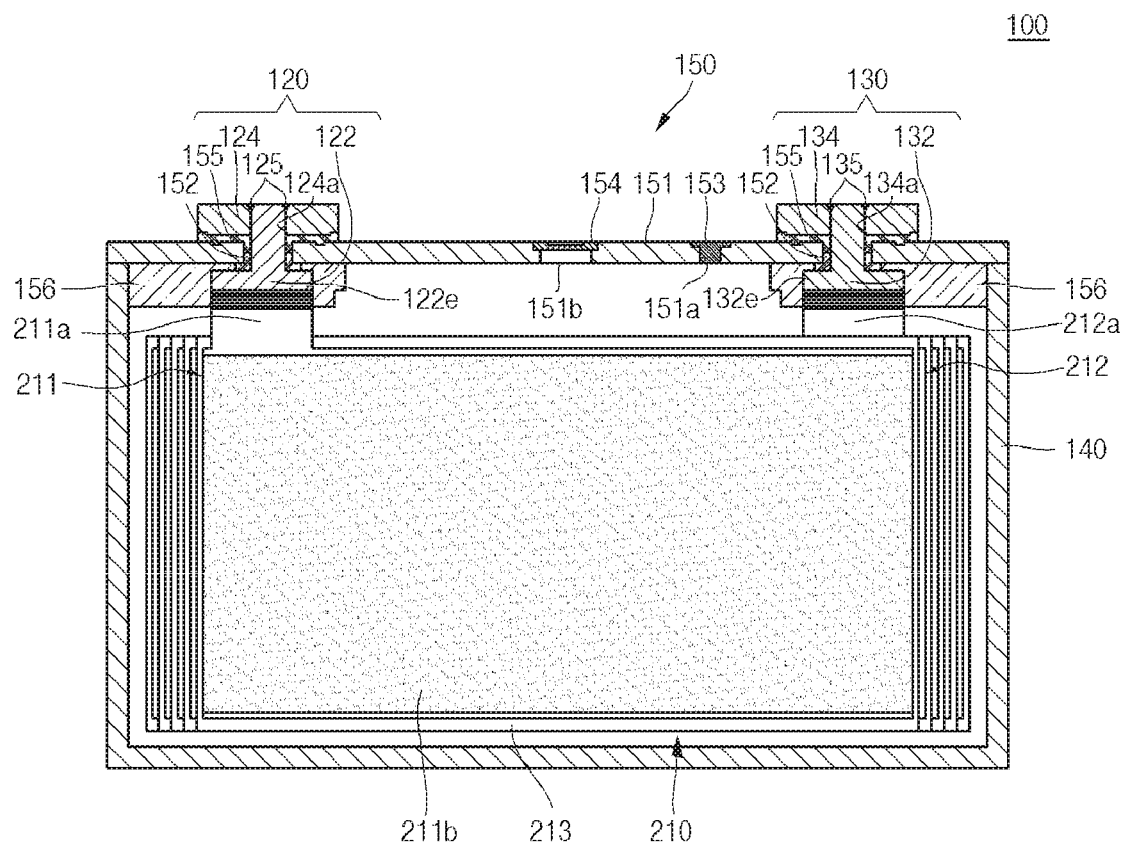
Figure 10:
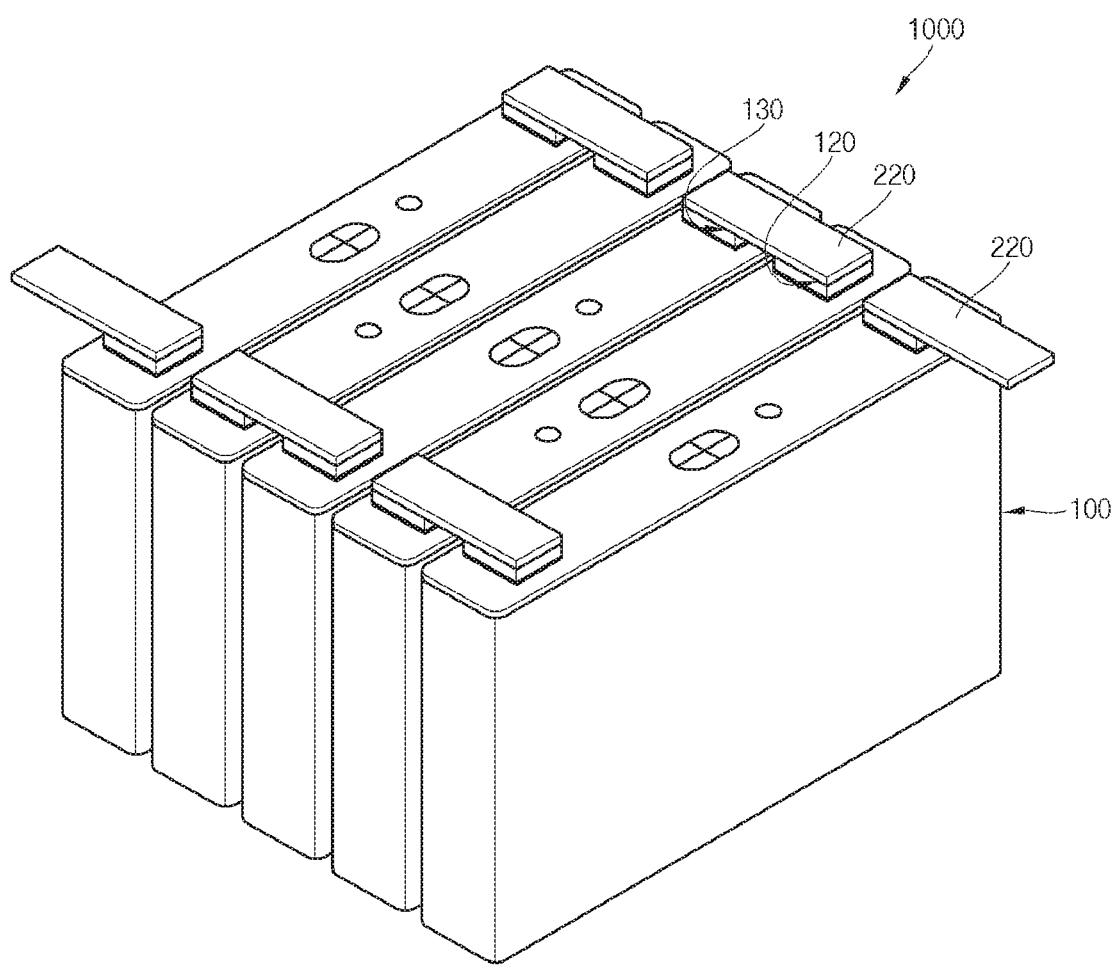
FIG. 10 is a perspective view of a battery module including secondary batteries according to various embodiments of the present invention.

FIGS. 9A and 9B are an exploded perspective view and a cross-sectional view of another exemplary secondary battery with an embossed safety vent according to various embodiments of the present invention. FIG. 10 is a perspective view of a battery module including secondary batteries according to various embodiments of the present invention.

The secondary battery 200 according to various embodiments of the present invention is different from the secondary battery 100 according to the previous embodiment in view of a configuration of an electrode assembly 210 and a connection relationship between the electrode assembly 210 and first and second terminals 120 and 130.

As illustrated in FIGS. 9A and 9B, a winding axis of the electrode assembly 210 is substantially parallel to or substantially horizontal with a terminal axis of a first terminal pillar 122 of the first terminal 120 and a terminal axis of a second terminal pillar 132 of the second terminal 130. Here, the winding axis and the terminal axes may mean axes extending in the top-down direction in FIGS. 9A and 9B, and it is meant that when a winding axis and a terminal axis are referred to as being substantially parallel to or substantially horizontal with each other, they may not meet each other even by being lengthened or may meet each other by being lengthened extremely long.

In addition, a first electrode tab 211a is interposed between the electrode assembly 210 and the first terminal pillar 122 of the first terminal 120, and a second electrode tab 212a is interposed between the electrode assembly 210 and the second terminal pillar 132 of the second terminal 130. That is to say, the first electrode tab 211a extends from a top end of the electrode assembly 210 to a bottom end of the first terminal pillar 122 of the first terminal 120 to then be electrically connected to or welded to a planar flange 122e provided in the first terminal pillar 122. In addition, the second electrode tab 212a extends from the top end of the electrode assembly 210 to a bottom end of the second terminal pillar 132 of the second terminal 130 to then be electrically connected to or welded to a planar flange 132e provided in the second terminal pillar 132

Practically, the first electrode tab 211a may be a first uncoated portion itself, which is not coated on a first electrode plate 211 of the electrode assembly 210 with a first active material 211b, or a separate member connected to the first uncoated portion. Here, the first uncoated portion may be made of the same material with the first electrode plate 211, and the separate member may be made of one selected from the group consisting of nickel, a nickel alloy, copper, a copper alloy, aluminum, an aluminum alloy and equivalents thereof.

In addition, the second electrode tab 212a may be practically a second uncoated portion itself, which is not coated on a second electrode plate 212 of the electrode assembly 210 with a first active material 212b, or a separate member connected to the second uncoated portion. Here, the second uncoated portion may be made of the same material with the second electrode plate 212, and the separate member may be made of one selected from the group consisting of aluminum, an aluminum alloy, nickel, a nickel alloy, copper, a copper alloy, and equivalents thereof.

As described above, since the winding axis of the electrode assembly and the terminal axes of the terminals are configured to be substantially parallel to or substantially horizontal with each other, the electrode assembly demonstrate excellent wettability with respect to an electrolyte during injection of the electrolyte and the safety vent rapidly operates owing to rapid movement of internal gases in an event of overcharging.

In addition, since an electrode tab (an uncoated portion itself or a separate member) of the electrode assembly is directly electrically connected to the terminal to shorten an electrical path, internal resistance of the secondary battery can be reduced and the number of components can be reduced.

FIG. 10 is a perspective view of a battery module including secondary batteries according to various embodiments of the present invention.

As illustrated in FIG. 10, a plurality of secondary batteries 100 are arranged in a line and a plurality of busbars 220 are coupled to the arranged secondary batteries 100, thereby completing a battery module 1000. For example, a first terminal 120 of one of the secondary batteries 100 is welded to a second terminal 130 of another adjacent secondary battery 100 by a busbar 220, thereby providing the battery module 1000 having the plurality of secondary batteries 100 connected to one another in series.

Here, since the busbars 220 are made of aluminum or an aluminum alloy, and the first terminal plate 124 of the first terminal 120 and the second terminal plate 134 of the second terminal 130 are also made of aluminum or an aluminum alloy, the busbars 220 can be easily welded to the first terminal 120 and the second terminal 130.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

Various embodiments of the present invention relate to a secondary battery.

The invention claimed is:

1. A secondary battery comprising:
    a case;
    a cap plate which is installed in the case and has a vent hole; and
    a safety vent which is coupled to the vent hole of the cap plate and ruptures when an internal pressure of the case is greater than a reference pressure,
    wherein the safety vent comprises:
    an embossed portion; and
    a notch portion formed in the embossed portion,
    wherein the embossed portion comprises a central portion protruding in a first direction and an outer portion protruding in a second direction opposite to the first direction, the central portion extending outside of the outer portion, and the notch portion is formed in the central portion.

2. The secondary battery of claim 1, wherein the embossed portion comprises:
    a first embossed portion formed along a periphery of the embossed portion and protruding in the first direction;
    a second embossed portion formed in the first embossed portion and comprising the outer portion protruding in the second direction; and
    a third embossed portion formed in the second embossed portion and comprising the central portion protruding in the first direction.

3. The secondary battery of claim 2, wherein the first embossed portion and the third embossed portion have semicircular cross sections protruding in the first direction.

4. The secondary battery of claim 2, wherein the second embossed portion has a rectangular cross section protruding in the second direction.

5. The secondary battery of claim 2, wherein the third embossed portions have +-shaped, X-shaped, or I-shaped planes.

6. The secondary battery of claim 2, wherein the first embossed portion has an elliptical plane.

7. The secondary battery of claim 2, wherein the safety vent comprises:
    a sloping portion outwardly extending from the first embossed portion in the second direction; and
    a peripheral portion outwardly extending from the sloping portion and coupled to a peripheral portion of a vent hole of the cap plate.

8. A secondary battery comprising:
    a case;
    a cap plate which is installed in the case and has a vent hole; and
    a safety vent which is coupled to the vent hole of the cap plate and ruptures when an internal pressure of the case is greater than a reference pressure,
    wherein the safety vent comprises:
    an embossed portion; and
    a notch portion formed in the embossed portion,
    wherein the embossed portion comprises:
    a first embossed portion formed along a periphery of the embossed portion and protruding in a first direction;
    a second embossed portion formed in the first embossed portion and protruding in a second direction opposite to the first direction; and
    a third embossed portion formed in the second embossed portion and protruding in the first direction, and
    wherein the second embossed portion is shaped to have multiple portions divided by the third embossed portion, and the divided second embossed portions are all coplanar.

* * * * *